(12) United States Patent
Boisson et al.

(10) Patent No.: US 11,149,570 B2
(45) Date of Patent: Oct. 19, 2021

(54) COMPOSITE OUTLET GUIDE VANE WITH METAL FASTENER FOR A TURBOMACHINE

(71) Applicant: SAFRAN AIRCRAFT ENGINES, Paris (FR)

(72) Inventors: Alexandre Bernard Marie Boisson, Moissy-Cramayel (FR); Larry Sylvio Laborieux, Moissy-Cramayel (FR); Kaëlig Merwen Orieux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 90 days.

(21) Appl. No.: 16/512,931

(22) Filed: Jul. 16, 2019

(65) Prior Publication Data
US 2020/0025001 A1   Jan. 23, 2020

(30) Foreign Application Priority Data
Jul. 17, 2018 (FR) ...................................... 1856609

(51) Int. Cl.
*F01D 9/04* (2006.01)
*F01D 25/06* (2006.01)
(Continued)

(52) U.S. Cl.
CPC ............. *F01D 9/042* (2013.01); *F01D 25/06* (2013.01); *F05D 2220/30* (2013.01);
(Continued)

(58) Field of Classification Search
CPC ........ F01D 9/042; F01D 5/282; F01D 25/246; F01D 5/147; F01D 5/30; F01D 9/041;
(Continued)

(56) References Cited

U.S. PATENT DOCUMENTS 5,765,993 A * 6/1998 Weiss ...................... F01D 9/042
                                                                    415/209.2
6,619,917 B2 * 9/2003 Glover .................. F04D 29/542
                                                                    415/209.3
(Continued)

FOREIGN PATENT DOCUMENTS

EP    2 412 931 A2   2/2012
EP    3 018 363 A1   5/2016
(Continued)

OTHER PUBLICATIONS

French Preliminary Search Report dated Apr. 18, 2019 in counterpart application No. 1856609.

*Primary Examiner* — J. Todd Newton
*Assistant Examiner* — Eric J Zamora Alvarez
(74) *Attorney, Agent, or Firm* — Sughrue Mion, PLLC

(57) ABSTRACT

An outlet guide vane for a fan of a turbomachine is provided. The outlet guide vane includes a blade made of composite material and having a radial inner end, a first metal fastener portion fastened to the radial inner end, a first platform extending transversely with respect to the blade in the vicinity of the radial inner end. The first metal fastener portion is to be mounted on and fastened to an upstream flange and to a downstream flange of a hub. The first platform is monolithic with the first metal fastener portion or with the blade. A rectifier wheel and a turbomachine including the outlet guide vane are also provided.

10 Claims, 8 Drawing Sheets

(51) Int. Cl.
   *F04D 29/02*     (2006.01)
   *F04D 29/64*     (2006.01)
   *F01D 5/28*      (2006.01)

(52) U.S. Cl.
   CPC ...... *F05D 2230/60* (2013.01); *F05D 2240/12* (2013.01); *F05D 2240/80* (2013.01); *F05D 2300/614* (2013.01)

(58) Field of Classification Search
   CPC ........ F01D 25/24; F01D 25/243; F01D 25/28; F01D 25/06; F05D 2220/30; F05D 2230/60; F05D 2240/12; F05D 2240/80; F05D 2300/614; F05D 2300/603; F05D 2220/36; F05D 2260/31; F05D 2260/37; F04D 29/322
   See application file for complete search history.

(56)          References Cited

U.S. PATENT DOCUMENTS 8,998,575 B2 *   4/2015   Lucashu ................... F01D 9/04
                                                          415/190
   2014/0169956 A1   6/2014   Lyders
   2016/0245103 A1 * 8/2016   Gimat ..................... F01D 25/24
   2016/0305263 A1 * 10/2016  Yagi ...................... F01D 25/162

FOREIGN PATENT DOCUMENTS

EP        2 412 931 A3    12/2017
   WO        2014/076408 A1   5/2014

* cited by examiner

COMPOSITE OUTLET GUIDE VANE WITH METAL FASTENER FOR A TURBOMACHINE

FIELD OF THE INVENTION

The present invention relates to an outlet guide vane for a turbomachine, in particular a vane comprising a blade made of composite material and a metal fastener portion.

TECHNOLOGICAL BACKGROUND

A dual-flow turbojet engine generally comprises, from upstream to downstream in the direction of flowing of the gases, a fan ducted and housed in a fan casing, an annular space of a primary flowing and an annular space of a secondary flowing. The air mass sucked by the fan is therefore divided into a primary flow, which circulates in the primary flowing space, and into a secondary flow, which is concentric with the primary flow and which circulates in the secondary flowing space.

The primary flowing space passes through a primary body comprising one or several compressor stage(s), for example a low-pressure compressor and a high-pressure compressor, a combustion chamber, one or several turbine stage(s), for example a high-pressure turbine, and a low-pressure turbine, and a gas exhaust nozzle.

A turbojet engine may be equipped with a rectifier wheel in the secondary flow path, a rectifier wheel comprising Outlet Guide Vanes (OGV). These outlet guide vanes are located in the cold portion of the turbojet engine, downstream of the fan vanes with respect to the direction of a cold air flow in the turbomachine. They are intended both to straighten the cold air flow from the fan vanes, as well as to ensure the transmission of a portion of the mechanical forces from the inner casing to the outer casing.

In the case of a rectifier wheel whose outlet guide vanes are made of composite material, each vane must, in order to guarantee its mechanical strength, be fastened radially, on the one hand, to a hub of an inner casing and, on the other hand, to an intermediate casing ferrule of an outer casing.

In order to improve the propulsive efficiency of the turbojet engine and to reduce its specific consumption as well as the noise emitted by the fan, it has been proposed turbojet engines having a bypass ratio (which corresponds to the ratio between the flow rate of the secondary (cold) flow and the flow rate of the primary (hot) flow (which passes through the primary body).

The dimensions of the fan increase globally with the amount of sucked secondary flow, therefore with the bypass ratio of the turbojet engine it equips. A turbojet engine with a high bypass ratio will thus lead to a high diameter of the fan, and therefore of the turbojet engine. The transport constraints of a turbojet engine with a high bypass ratio may require a modular mounting of a fan module, comprising in particular the fan, the rectifier wheel, the hub, the intermediate casing ferrule, the inner casing and the outer casing, on a propulsion module. The mounting is then performed by the outlet guide vanes of the rectifier wheel.

However, the positioning related to the modular mounting is not compatible with the type of fastener of an outlet guide vane made of composite material to the hub of the inner casing and to the intermediate casing ferrule of the outer casing. Indeed, to achieve this positioning, the outlet guide vane needs a centering device (conical bearing, axial stop, or the like). However, such centering devices are expensive to implement, and do not have satisfactory mechanical characteristics.

In addition, the flowing of secondary flow must be the least disturbed possible by the fastener of the vane to the hub of the inner casing. To limit these disturbances, it is possible to make platforms to be mounted on each vane. Thus, when the outlet guide vanes are mounted between an internal hub and an external intermediate casing ferrule to form a rectifier wheel, the platforms reconstitute a secondary flow path in order to ensure good quality of the flowing.

An example of outlet guide vanes including platforms made of composite material is described in document WO 2014/076408. Nevertheless, such vanes entirely made of composite material generate manufacturing and industrialization difficulties, as well as a mechanical strength difficult to control. An example of outlet guide vanes including metal platforms is described in document EP 2 412 931. Nevertheless, these platforms, in order to be fastened to the outlet guide vanes, require the introduction of additional parts, which generates an increased mass, mounting complexity and bulk.

SUMMARY OF THE INVENTION

An aim of the invention is to propose a solution having improved mechanical and aerodynamic characteristics compared to the prior art for an outlet guide vane whose blade is made of composite material.

Another aim of the invention is to provide an outlet guide vane whose mass is reduced and manufacture is facilitated compared to the prior art.

Another aim of the invention is to provide an outlet guide vane allowing a modular mounting of a fan module on a propulsion module.

According to a first aspect, the invention relates to an outlet guide vane for a fan of a turbomachine, the outlet guide vane extending along a radial axis, the radial axis extending along a direction perpendicular to a central axis of symmetry of the fan and passing therethrough, the fan comprising a hub including an upstream flange and a downstream flange, the outlet guide vane comprising:
  a blade made of composite material comprising a fiber reinforcement densified by a matrix and extending along the radial axis, said blade having a radial inner end and a radial outer end,
  a first metal fastener portion fastened to the radial inner end of the blade,
  at least a first platform extending transversely with respect to the blade in the vicinity of its radial inner end,
  the outlet guide vane being characterized in that said first metal fastener portion is configured to be mounted on and fastened, on the one hand, to the upstream flange and, on the other hand, to the downstream flange of the hub, and in that the first platform is monolithic with the first metal fastener portion or with the blade.

Such a blade made of composite material offers a smaller mass than the same blade that would be made of metal. The composite blade portion of the outlet guide vane is dissociated from the fastener portion, which is metallic. This allows an improved mechanical strength compared to a vane and a fastener that would be integrally made of composite material, and an easier manufacture.

The at least one platform in the vicinity of the radial inner end of the blade allows reconstituting of the secondary flow path and thus offers a better flowing quality, the disturbances due to the presence of the fastener being limited.

Moreover, this first platform is monolithic either with the fastener or with the blade, which has the effect of limiting the number of parts to be designed and assembled, and thus reducing the mass, bulk and complexity of the outlet guide vane.

Some preferred but non-limiting characteristics of the outlet guide vane are as follows, taken individually or in combination:

the outlet guide vane further comprises a second platform extending transversely with respect to the blade in the vicinity of the radial outer end of the blade, the outlet guide vane further comprises a second fastener portion fastened to the radial outer end of the blade, said second portion being configured to be mounted on and fastened to a casing, said second portion being metallic or made of a composite material comprising a fiber reinforcement densified by a matrix, the second fastener portion is metallic and the second platform is metallic and monolithic with the second metal fastener portion, the second fastener portion is metallic, and the outlet guide vane further comprises a damping device disposed between the second metal fastener portion and the blade, the second fastener portion is made of composite material and is monolithic with the blade, the outlet guide vane further comprises a damping device disposed between the first metal fastener portion and the blade.

According to a second aspect, the invention relates to a rectifier wheel of a turbomachine fan, said rectifier wheel comprising a hub and at least one outlet guide vane according to the first aspect mounted on and fastened to the hub, wherein:

the hub has a transverse face, an upstream flange and a downstream flange, the upstream flange and the downstream flange each having a transverse face, an upstream face and a downstream face, and the first metal fastener portion comprises a first edge configured to bear against one among the transverse face of the upstream flange and the transverse face of the downstream flange, and a second edge configured to bear against one among the upstream face of the downstream flange and the downstream face of the upstream flange.

The first metal fastener portion of such a rectifier wheel may have a shape adapted to ensure a positioning of the outlet guide vane, the first metal fastener portion having:

a first edge having an inclination with respect to the central axis of symmetry of the fan, at an angle adapted to correspond to an angle of inclination of the transverse face of the upstream flange of the hub, and/or a second edge comprising a protrusion of shape and dimensions adapted to be complementary to those of a groove formed in the upstream face of the downstream flange of the hub, and/or a third edge having a shape adapted to press it against intrados and extrados walls of the outlet guide vane.

According to a third aspect, the invention relates to a turbomachine comprising at least one outlet guide vane according to the first aspect.

PRESENTATION OF THE FIGURES

Other aspects, objects and advantages of the present invention will become apparent upon reading the following detailed description, given by way of non-limiting example, which will be illustrated by the following figures.

DETAILED DESCRIPTION OF ONE EMBODIMENT

Figure 1:
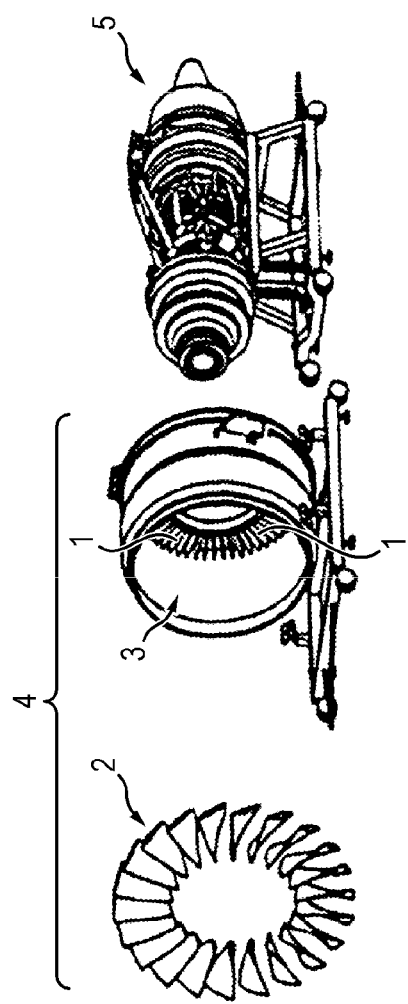
FIG. 1 is a diagram representing a fan module and a propulsion module adapted to be mounted via outlet guide vanes in accordance with one embodiment of the invention.

In the present application, the upstream and downstream are defined with respect to the direction 7 of normal flowing of the gas in the fan 2 through the turbomachine. Furthermore, the longitudinal axis X is called central axis X of symmetry of the fan 2. The longitudinal direction corresponds to the direction of the X axis, and a radial direction is a direction perpendicular to this axis and passing therethrough. A transverse direction Y is a direction perpendicular to the X axis and not passing therethrough. Unless otherwise specified, the terms inner and outer, respectively, are used with reference to a radial direction so that the inner portion or face of an element is closer to the X axis than the outer portion or face of the same element.

FIGS. 2a, 2b, 3a and 3b represent an outlet guide vane 1 for a turbomachine rectifier wheel 3.

The turbomachine comprises an inner casing having a hub 6 and an outer casing having an intermediate casing ferrule, the inner and outer casings delimiting, respectively inside and outside, a flow path of gas flowing of secondary flow in the turbomachine.

Figure 4A:
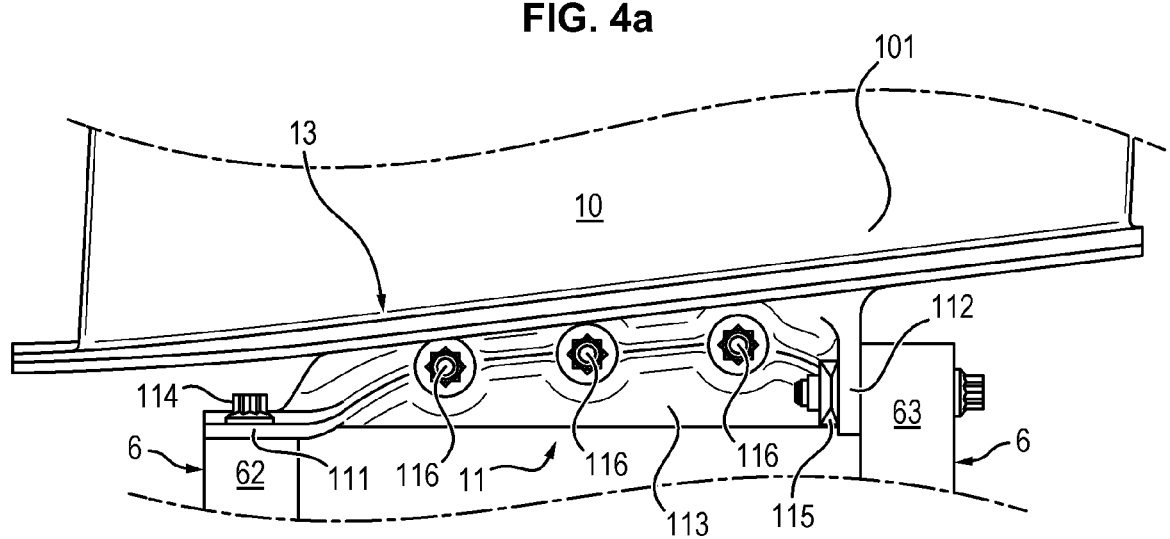
FIGS. 4a to 4d are diagrams representing a first metal fastener portion according to embodiments of the invention.
Figure 4B:
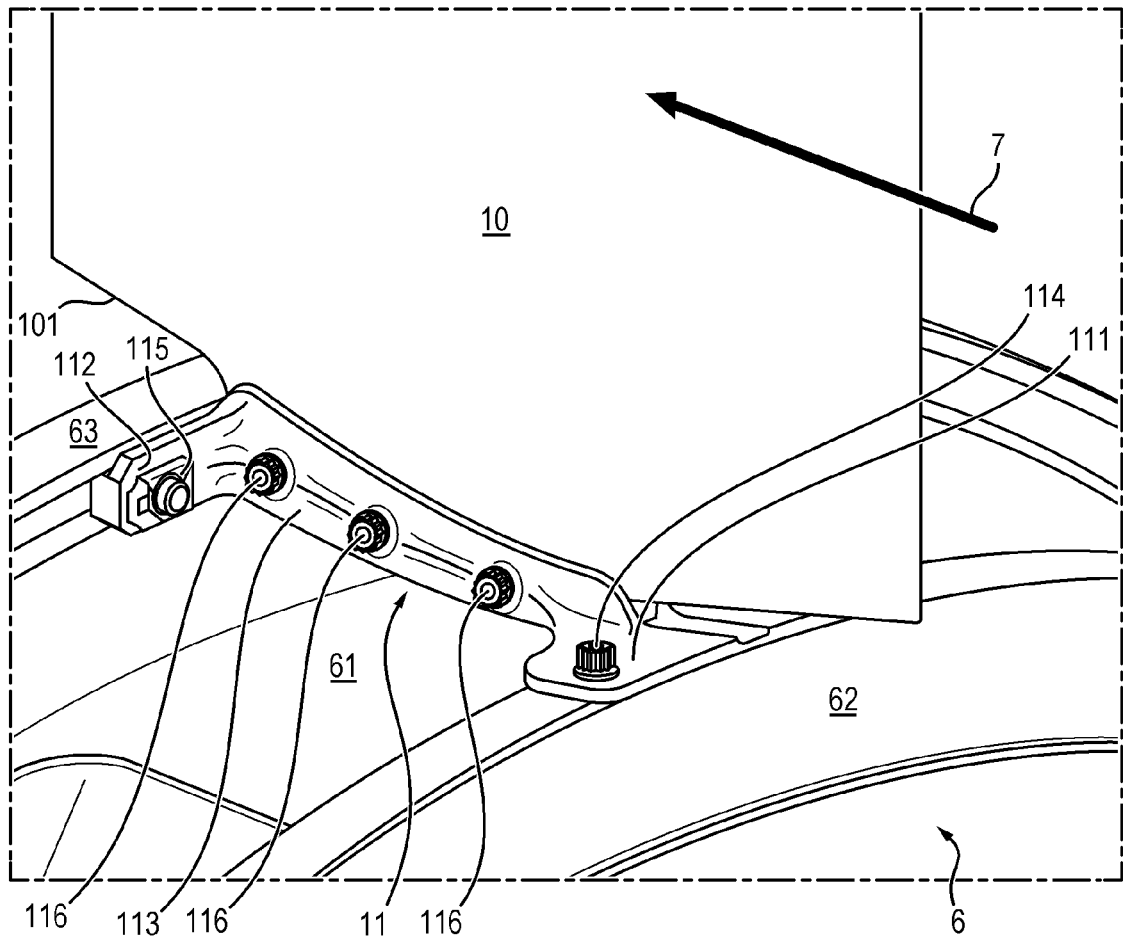

The hub 6 of the inner casing, represented for example in FIG. 4b, may have a transverse face 61, an upstream flange 62 and a downstream flange 63. The upstream flange 62 and the downstream flange 63 each represent an upstream face configured to face a hub of the fan 2, a downstream face opposite to the upstream face, and a transverse face connecting the upstream face and the downstream face.

The outlet guide vane 1 is intended to be positioned downstream of the fan 2. The outlet guide vane 1 comprises a blade 10. The blade 10 is made of composite material comprising a fiber reinforcement densified by a matrix and extending along the radial axis.

The fiber reinforcement can be formed from a fibrous preform obtained by three-dimensional weaving with progressive thickness. It may in particular comprise carbon, glass, aramid and/or ceramic fibers. The matrix for its part is typically a polymer, for example epoxy, bismaleimide or polyimide, matrix. The vane 1 is then formed by molding using a resin vacuum injection process of the RTM ("Resin Transfer Molding")-type or VARRTM ("Vacuum Resin Transfer Molding")-type.

The blade 10 has a leading edge and a trailing edge, connected by an intrados wall and an extrados wall. The leading edge is configured to extend opposite to the flowing of gases entering the turbomachine. It corresponds to the anterior portion of an aerodynamic profile that faces the air flow and divides the air flowing into an intrados flowing and an extrados flowing. The trailing edge, for its part, corresponds to the posterior portion of the aerodynamic profile, where the intrados flowing and extrados flowing meet. The intrados and extrados walls of the blade 10 define a profile having dimensions adapted to straighten the cold air flow downstream of the fan vanes 2, as well as to ensure the transmission of a portion of the mechanical forces from the inner casing to the outer casing.

The blade 10 comprises a radial inner end 101 and a radial outer end 102. The radial outer end 102 of the blade 10 can be fastened to the intermediate casing ferrule of the outer casing.

The outlet guide vane 1 also comprises a first metal fastener portion 11, illustrated by way of non-limiting example in FIGS. 4a to 4d. The first metal fastener portion 11 is fastened to the radial inner end 101 of the blade 10 and is configured to fasten the blade 10 to the hub.

More specifically, the first metal fastener portion 11 is configured to be mounted on and fastened, on the one hand, to the upstream flange 62 and, on the other hand, to the downstream flange 63 of the hub 6 of the inner casing. It can be made of materials such as aluminum or titanium.

The first metal fastener portion 11 may comprise an intrados portion in contact with the hub 6 and the intrados wall of the blade 10, and an extrados portion in contact with the hub 6 and the extrados wall of the blade 10. The intrados portion and the extrados portion of the first metal fastener portion 11 may have similar dimensions (in particular along the central axis of symmetry of the fan) and extend on either side of the blade 10. The blade 10 is sandwiched between the intrados portion and the extrados portion of the first metal fastener portion 11. According to a preferred embodiment, each of the intrados and extrados portions includes a first edge 111, a second edge 112 and a third edge 113.

The first edge 111 is configured to bear against one among the transverse face of the upstream flange 62 and the transverse face of the downstream flange 63 of the hub 6. The first edge 111 extends mainly in the transverse and longitudinal directions of the fan.

The second edge 112 is configured to bear against one among the upstream face of the downstream flange 63 and the downstream face of the upstream flange 62 of the hub 6. The second edge 112 extends mainly in the transverse and radial directions of the fan.

The first edge 111 and/or the second edge 112 each comprise one or several bore(s) 114, 115 so as to be fastened to the hub 6 by one or several fastening mean(s) such as bolts, screws, or any other possible fastening means.

The third edge 113 of the intrados (respectively extrados) portion connects the first edge 111 and the second edge 112 and is configured to bear against the intrados (respectively extrados) wall of the blade 10 in the vicinity of or at its radial inner end 101. The third edge 113 extends mainly in the radial and longitudinal directions of the fan. The third edge 113 comprises one or several bore(s) 116 associated with as many orifices formed in the blade 10 so as to fasten the third edge 113 to the blade 10 by means of one or several fastening mean(s), such as bolts. The orifice(s) is/are formed in the blade 10 in a transverse direction so that, when the blade is being positioned, the orifices are disposed opposite the bores 116 of the third edge 113. Each orifice of the blade is intended to receive a screw. A nut on the side of the intrados (respectively extrados) portion blocks the screw on the side of the intrados (respectively extrados) wall of the blade 10.

In the exemplary embodiment illustrated, the first edge 111 is configured to bear against the transverse face of the upstream flange 62 of the hub 6, and is fastened thereto by a screw and an insert. The second edge 112 is configured to bear against the upstream face of the downstream flange 63 of the hub 6, and is fastened thereto by a bolt. The third edge 113 is fastened to the blade 10 by three bolts.

The first and second edges 111, 112 fasten the first metal fastener portion 11 to the hub 6 of the inner casing. The third edge 113 fastens the first metal fastener portion 11 to the blade 10. Thus, the first metal fastener portion 11 fastens the blade 10 to the hub 6 of the inner casing.

When the transport constraints of the turbojet engine require a modular mounting of a fan module 4 on a propulsion module 5, the mounting is carried out by the outlet guide vanes 1 of the secondary rectifier 3, as illustrated in FIG. 1. The first metal fastener portion 11 can then ensure the positioning of the outlet guide vane 1 with respect to the hub 6.

For this purpose, the transverse face of the upstream flange 62 of the hub 6 and the first edge 111 of the first metal fastener portion 11 may have a slight inclination with respect to the central axis of symmetry of the fan, in order to ensure a positioning the outlet guide vane 1 with respect to the upstream flange 62.

Moreover, as illustrated in FIG. 4b, a groove may be formed in the upstream face of the downstream flange 63, and a downstream face of the second edge 112 of the first metal fastener portion 11 may comprise a protrusion, extending along the longitudinal direction from said downstream face, the groove and the protrusion being of complementary shape and dimensions in order to ensure the positioning of the outlet guide vane 1 with respect to the downstream flange 63.

Finally, the third edge 113 has a shape allowing it to be pressed against the intrados and extrados walls of the outlet guide vane 1 in order to ensure its positioning.

Thus, the positioning of the fan module 4 on the propulsion unit 5 from the upstream of the outlet guide vane 1 is facilitated.

The outlet guide vane 1 also comprises a first platform 13 extending transversely with respect to the blade 10 in the vicinity of its radial inner end 101.

Preferably, the first platform 13 consists of two half-platforms. The intrados (respectively extrados) half-platform extends on the side of the intrados (respectively extrados) wall of the blade 10. The two half-platforms can have similar dimensions, and extend on both sides of the blade 10.

Preferably, the dimension of each half-platform in the longitudinal direction is substantially equal to that of the blade 10. The dimension of each half-platform in the transverse direction can be adapted to ensure their junction when the outlet guide vanes 1 are mounted between an internal hub 6 and an intermediate casing ferrule to form a rectifier wheel 3, the platforms 13 then reconstructing a secondary flow path wall. The elements constituting the first metal fastener portion 11 are then masked, which allows limiting the resulting disturbances of the flowing without introducing additional parts.

As a variant, the dimension of the half-platforms in the longitudinal direction may be smaller or greater than that of the blade 10, and their dimension in the transverse direction may not lead to the reconstitution of a secondary flow path. The first platform 13 may have only one intrados half-platform, one extrados half-platform, or have two half-platforms of different dimensions.

Figure 3B:
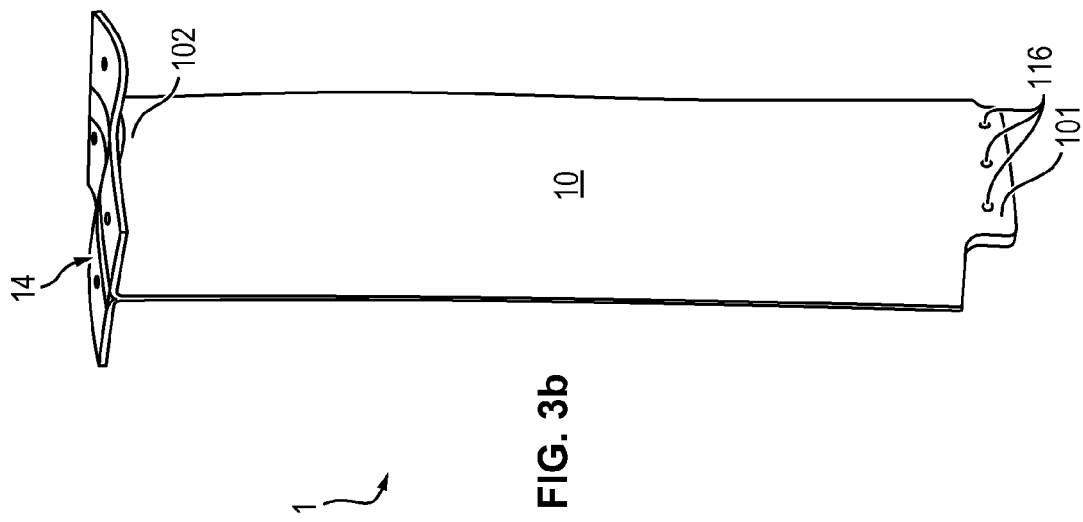
FIGS. 3a and 3b are diagrams representing an outlet guide vane in accordance with one embodiment of the invention.
Figure 3A:
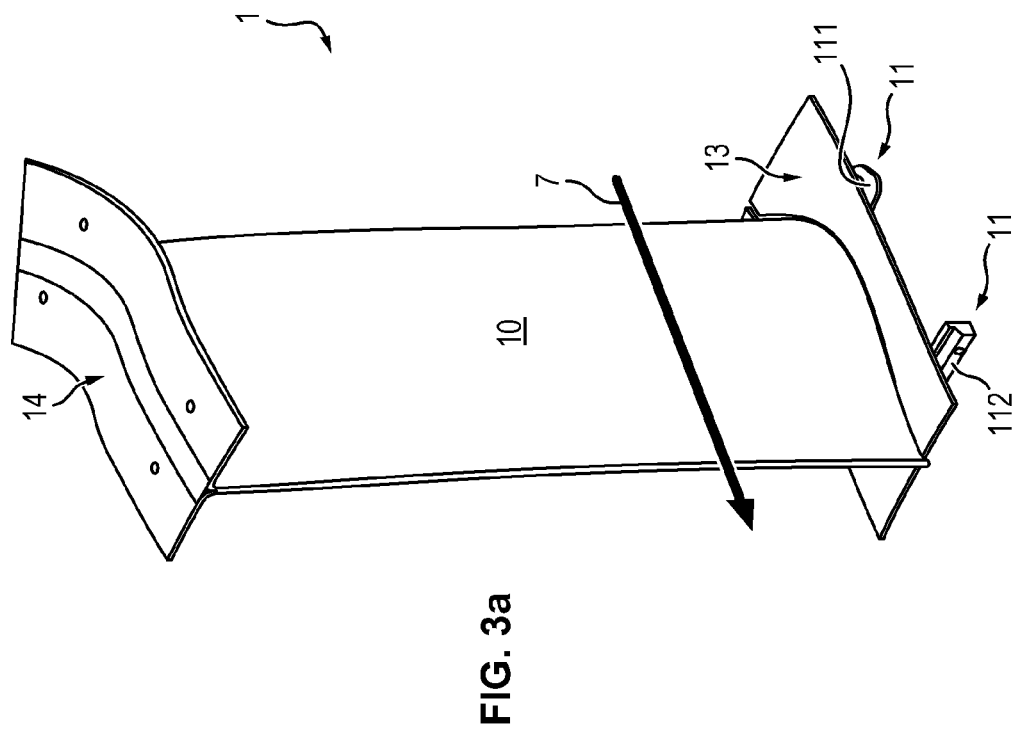
Figure 4C:
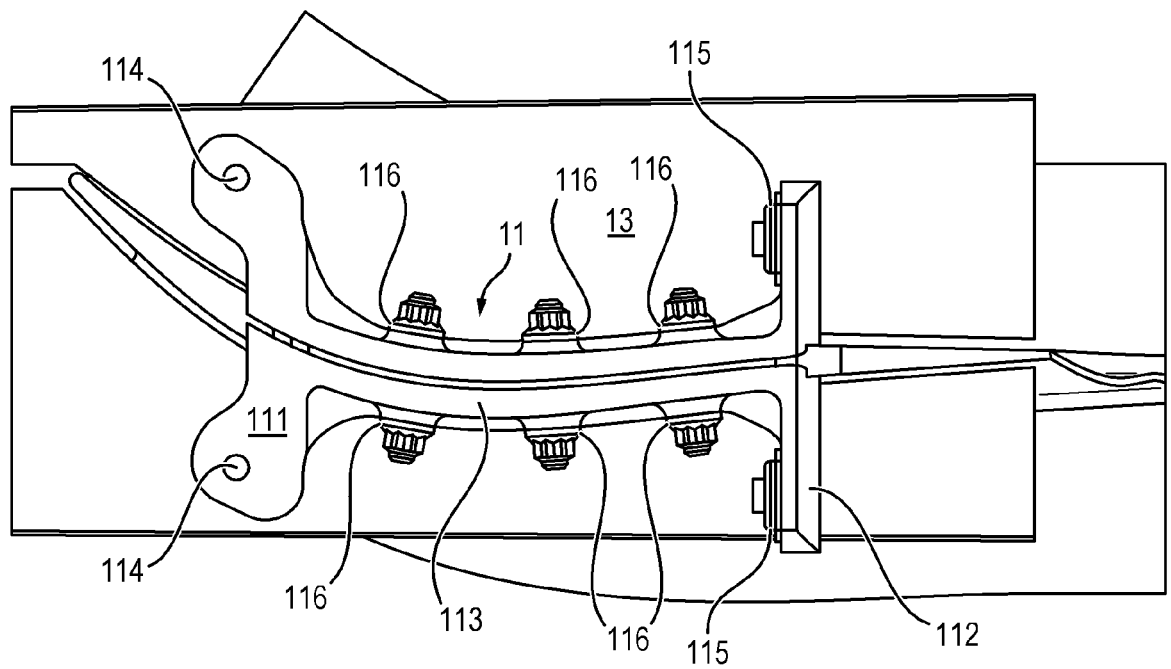
Figure 4D:
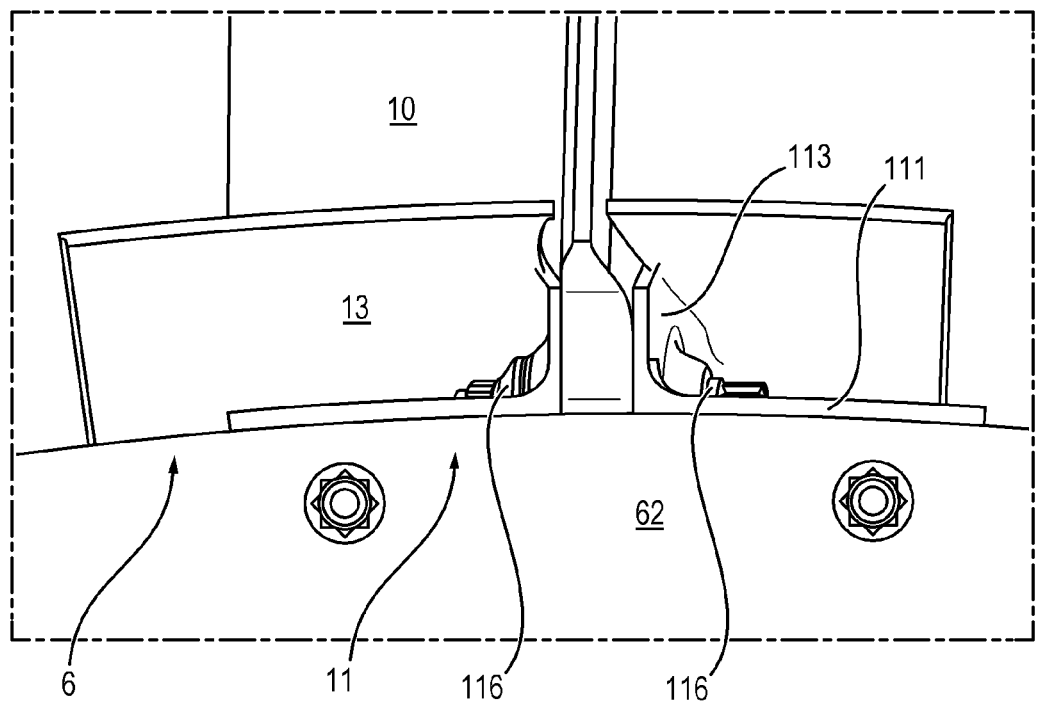

FIGS. 3a, 4c and 4d illustrate the case where the first platform 13 and the first metal fastener portion 11 are monolithic. By monolithic, it will be understood here that the first platform 13 and the first metal fastener portion 11 are formed integrally and in one piece, here of metal. For example, they may be integrally cast. In this exemplary embodiment, the intrados (respectively extrados) half-platform extends from the radially outer portion of the third edge 113 of the intrados (respectively extrados) portion of the first metal fastener portion 11, transversely to the third edge 113.

Figure 2A:
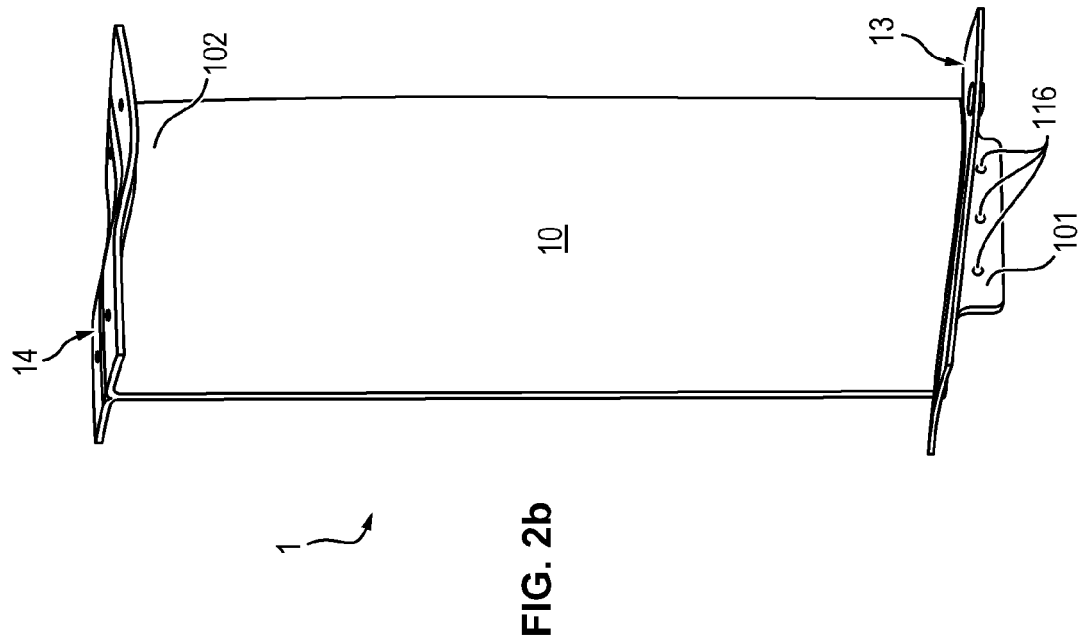
FIGS. 2a and 2b are diagrams representing an outlet guide vane in accordance with one embodiment of the invention.
Figure 2B:
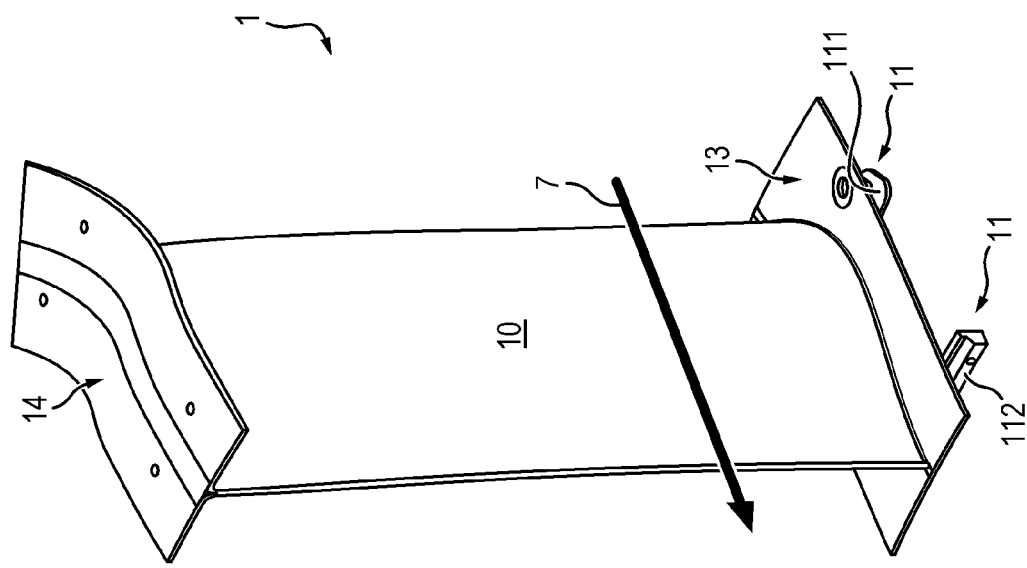

FIGS. 2a, 2b and 4a illustrate the case where the first platform 13 and the blade 10 are monolithic. By monolithic, it will be understood here that the first platform 13 and the blade 10 are formed integrally and in one piece. Thus, in this exemplary embodiment, the first platform 13 is, like the blade 10, made of composite material, which offers a weight gain compared to a first metal platform 13. The first platform 13 is located in a position radially more external on the blade 10 than the first metal fastener portion 11. It may be in contact with the first metal fastener portion 11. The position of the first platform 13 can be chosen so as to optimize the quality of the flowing, the mass of the outlet guide vane 1 and/or its maintenance.

The first platform 13 may be made by forming a debinding of the fiber reinforcement of the blade 10. Methods for weaving vane preforms to achieve debindings are described for example in document WO 2014/076408. In a binding area, all the layers of warp yarns are secured to each other by weft yarns, thus forming a single strip. Conversely, in a debinding area, two strips are woven together but with independent weft yarns for each one, so that a debinding plane is formed therebetween. The preform is woven longitudinally, then the debinding areas are folded transversely, which allows forming the debindings.

Figure 6:
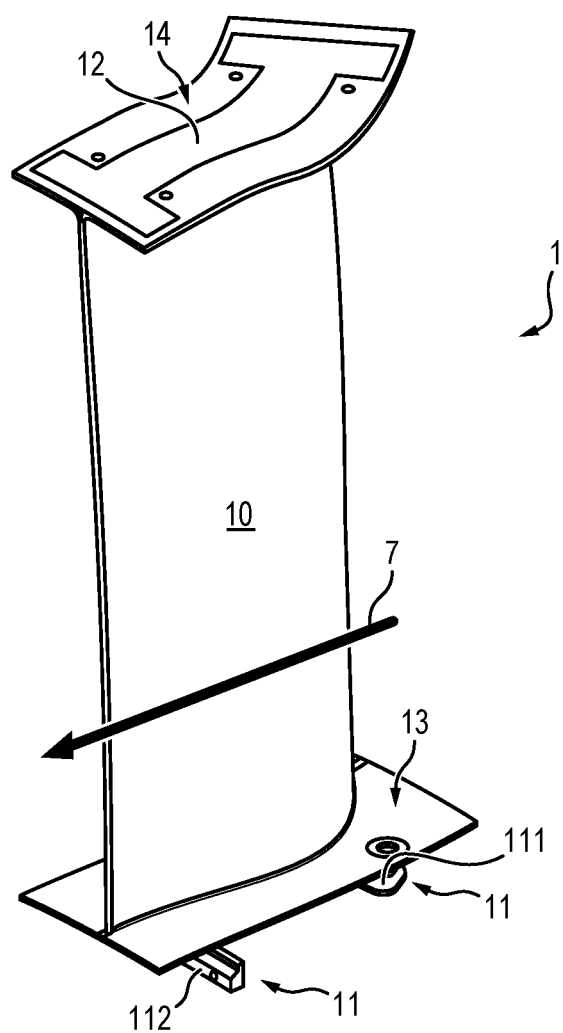
FIG. 6 is a diagram representing an outlet guide vane in accordance with another embodiment of the invention.
Figure 7:
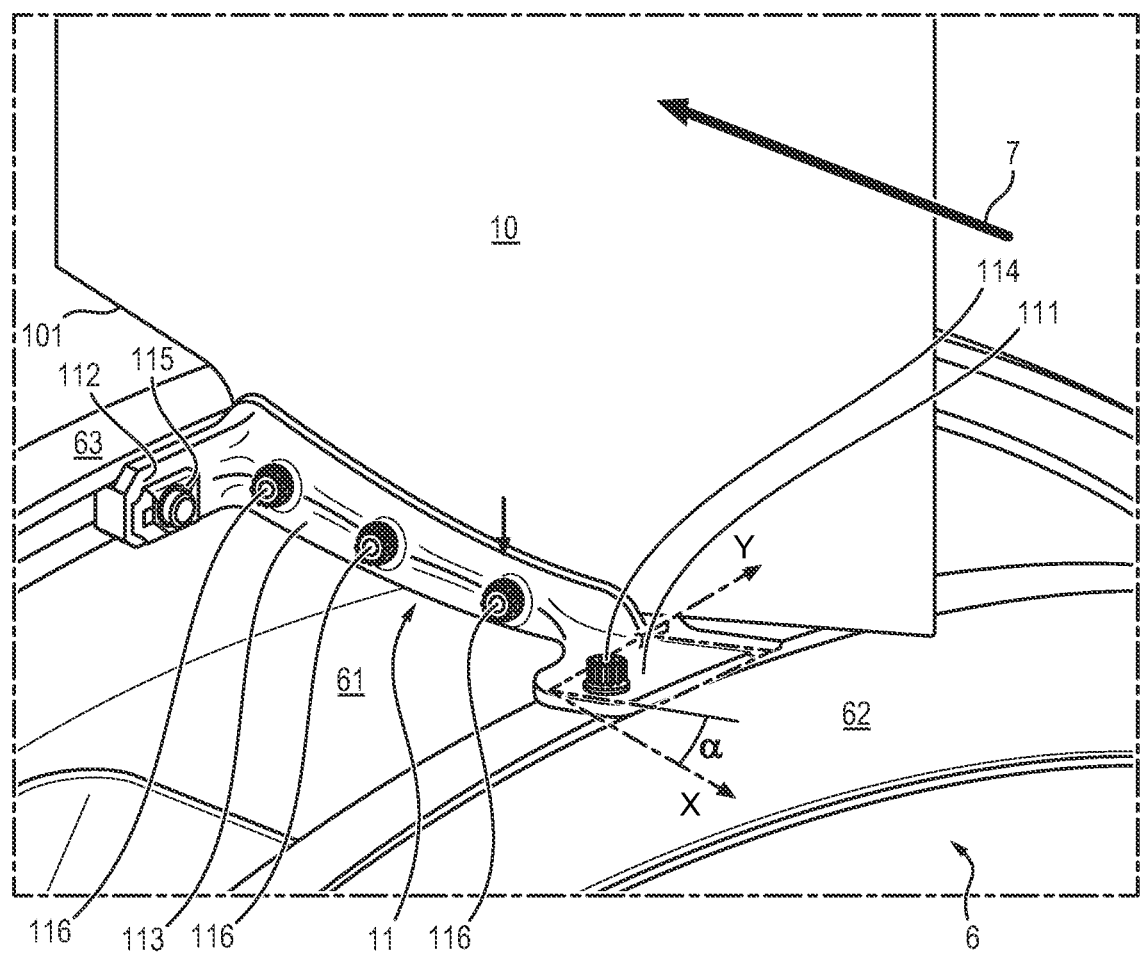
FIG. 7 is a diagram representing a first metal fastener portion according to embodiments of the invention.

As illustrated in FIG. 6, the outlet guide vane 1 may also comprise a second fastener portion 12. The second fastener portion 12 is fastened on the radial outer end 102 of the blade 10, and is configured to be mounted on and fastened to the outer casing, in particular on the intermediate casing ferrule.

The second fastener portion 12 may be metallic or made of a composite material comprising a fiber reinforcement densified by a matrix. The composite material is then the same as that of the blade 10.

The second fastener portion 12 may comprise an intrados portion extending on the side of the intrados wall of the blade 10, and an extrados portion extending on the side of the extrados wall of the blade 10. The intrados portion and the extrados portion of the second fastener portion may have similar dimensions and extend on either side of the blade 10. The blade 10 is sandwiched between the intrados portion and the extrados portion of the second fastener portion 12.

The second fastener portion 12 may be metallic. The second metal fastener portion 12 may have materials and an architecture similar to those of the first metal fastener portion 11, with a first edge and a second edge fastened to the intermediate casing ferrule, and a third edge fastened to the blade 10.

The second fastener portion 12 may be made of composite material and monolithic with the blade 10. The second fastener portion 12 may consist of a debinding of the blade 10, and extend transversely with respect to the blade 10 in the vicinity of its radial outer end 102. The debinding may for example be screwed or bolted to the intermediate casing ferrule.

The outlet guide vane 1 may also comprise a second platform 14 extending transversely with respect to the blade 10 in the vicinity of its radial outer end 102.

Preferably, the second platform 14 consists of two half-platforms. The intrados half-platform extends on the side of the intrados wall of the blade 10, and the extrados half-platform extends on the side of its extrados wall. The half-platforms of the second platform 14 may have dimensioning rules similar to those of the half-platforms of the first platform 13.

The second platform 14 may be mounted on the outlet guide vane 1 in order to simplify the maintenance, or may be monolithic with the second metal fastener portion or with the blade 10.

In the case where the second platform 14 is metallic and monolithic with the second metal fastener portion, similarly to a first platform 13 metallic and monolithic with the first metal fastener portion 11, the intrados (respectively extrados) half-platform can extend from the third edge of the intrados (respectively extrados) portion of the second metal fastener portion, transversely to the third edge, so as to be located in a position radially more internal on the blade 10 than the second fastener portion.

FIGS. 2a and 2b illustrate the case where the second platform 14 and the blade 10 are monolithic. The second platform 14 is then made of composite material. It is located in a position radially more internal on the blade 10 than the second fastener portion, and can be in contact with the latter.

Figure 5:
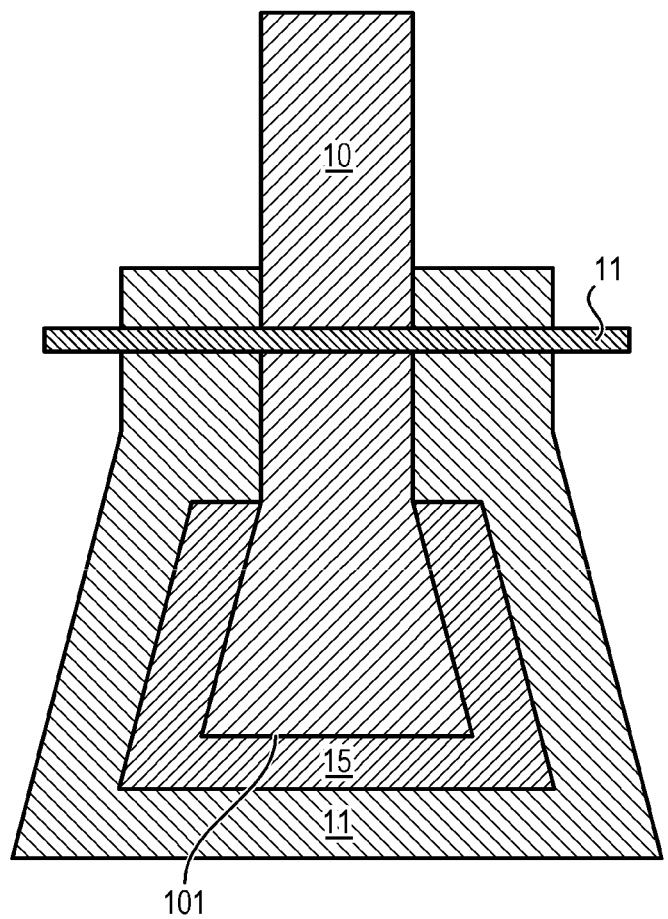
FIG. 5 is a diagram representing an outlet guide vane provided with a damping device in accordance with one embodiment of the invention.

The outlet guide vane 1 may also comprise a damping device 15, illustrated in FIG. 5, disposed between the first metal fastener portion 11 and/or the second metal fastener portion and the blade 10. The damping device 15 may be in the form of an addition of material which at least party surrounds the radial inner 101 and/or outer 102 end of the blade 10.

Such a damping device 15 allows improving the service life and the response of the outlet guide vane 1 faced in particular to the compression and vibration phenomena.

Several outlet guide vanes 1 according to one of the embodiments described above can be assembled so as to form a rectifier wheel 3.

The assembly of the outlet guide vane 1 to the intermediate casing ferrule and to the hub 6 is performed by fastening the first metal fastener portion 11 to the radial inner end 101 of the blade 10, and the second fastener portion, if it is metallic, to the radial outer end 102 of the blade 10.

Then the first metal fastener portion 11 is placed on the hub 6 and fastened thereto, and the second fastener portion is fastened to the intermediate casing ferrule.

The assembly order of the elements is in no way limiting. A different order can be considered, for example by firstly fastening the fastener portions respectively to the hub 6 and to the ferrule, and by secondly fastening the blade 10 thereto.

Other embodiments may be considered and those skilled in the art can easily change the embodiments or exemplary embodiments described above, or consider others one, while remaining within the scope of the invention. For example, the number of platforms 13, 14 may vary to comply with possible local specificities of the inner casing, or to facilitate some aspects of the mounting or of the maintenance.

The different characteristics of these embodiments or exemplary embodiments may be used alone or be combined together. When combined, these characteristics may be used as described above or differently, the invention not being limited to the specific combinations described in the present disclosure. Particularly, unless otherwise specified, a characteristic described in relation with an embodiment or exemplary embodiment may be applied in a similar manner to another embodiment or exemplary embodiment.

The invention claimed is:

1. An outlet guide vane for a fan module of a turbomachine, the outlet guide vane extending along a radial axis, the radial axis extending along a direction perpendicular to a central axis of symmetry of the fan module and passing therethrough, the fan module comprising a hub including an upstream flange and a downstream flange, the outlet guide vane comprising:
- a blade made of composite material comprising a fiber reinforcement densified by a matrix and extending along the radial axis, said blade having a radial inner end and a radial outer end,
- a first metal fastener portion fastened to the radial inner end of the blade,
- a second fastener portion fastened to the radial outer end of the blade, said second fastener portion being configured to be mounted on and fastened to a casing, said second fastener portion being made of a composite material comprising a fiber reinforcement densified by a matrix, said second fastener portion being monolithic with the blade, and
- at least a first platform extending transversely with respect to the blade in a vicinity of the radial inner end of the blade,
- wherein said first metal fastener portion is configured to be mounted on and fastened to the upstream flange and to the downstream flange of the hub, and wherein the first platform is monolithic with the first metal fastener portion.

2. The outlet guide vane according to claim 1, further comprising a second platform extending transversely with respect to the blade in a vicinity of the radial outer end of the blade.

3. The outlet guide vane according to claim 1, further comprising a damping device disposed between the second fastener portion and the blade.

4. The outlet guide vane according to claim 1, further comprising a damping device disposed between the first metal fastener portion and the blade.

5. A turbomachine comprising at least one outlet guide vane according to claim 1.

6. A rectifier wheel of a turbomachine fan module, said rectifier wheel comprising at least one outlet guide vane for the turbomachine fan module, the at least one outlet guide vane extending along a radial axis, the radial axis extending along a direction perpendicular to a central axis of symmetry of the turbomachine fan module and passing therethrough, the turbomachine fan module comprising a hub including an upstream flange and a downstream flange, the at least one outlet guide vane comprising:
- a blade made of composite material comprising a fiber reinforcement densified by a matrix and extending along the radial axis, said blade having a radial inner end and a radial outer end,
- a first metal fastener portion fastened to the radial inner end of the blade,
- at least a first platform extending transversely with respect to the blade in a vicinity of the radial inner end of the blade,
- wherein said first metal fastener portion is configured to be mounted on and fastened to the upstream flange and to the downstream flange of the hub, and wherein the first platform is monolithic with the first metal fastener portion, wherein:
- the hub has a transverse face, the upstream flange and the downstream flange of the hub each having a transverse face, an upstream face and a downstream face, and
- the first metal fastener portion comprises a first edge and a second edge, wherein the first edge of the first metal fastener portion is configured to bear against either:
  - the transverse face of the upstream flange, in which case the second edge of the first metal fastener portion is configured to bear against the upstream face of the downstream flange; or
  - the transverse face of the downstream flange, in which case the second edge of the first metal fastener portion is configured to bear against the downstream face of the upstream flange.

7. The rectifier wheel according to claim 6, wherein the first metal fastener portion has a shape adapted to ensure a positioning of the outlet guide vane, the first metal fastener portion having the first edge having an inclination with respect to the central axis of symmetry of the fan, at an angle adapted to correspond to an angle of inclination of the transverse face of the upstream flange of the hub.

8. The rectifier wheel according to claim 6, wherein the first metal fastener portion has a shape adapted to ensure a positioning of the outlet guide vane, the first metal fastener portion comprising a protrusion adapted to be complementary to groove formed in the upstream face of the downstream flange of the hub.

9. The rectifier wheel according to claim 6, wherein the first metal fastener portion has a shape adapted to ensure a positioning of the outlet guide vane, the first metal fastener portion having a third edge having a shape adapted to be pressed against intrados and extrados walls of the outlet guide vane.

10. A rectifier wheel of a turbomachine fan module, said rectifier wheel comprising at least one outlet guide vane mounted on and fastened to a fan module hub,
- wherein the at least one outlet guide vane comprises a blade having a radial inner end and a radial outer end and a first metal fastener portion fastened to the radial inner end of the blade, wherein the fan module hub has a transverse face, an upstream flange and a downstream flange, the upstream flange and the downstream flange each having a transverse face, an upstream face and a downstream face, and
- wherein the first metal fastener portion comprises a first edge and a second edge, wherein the first edge of the first metal fastener portion is configured to bear against either:
  - the transverse face of the upstream flange, in which case the second edge of the first metal fastener portion is configured to bear against the upstream face of the downstream flange; or
  - the transverse face of the downstream flange, in which case the second edge of the first metal fastener portion is configured to bear against the downstream face of the upstream flange.

* * * * *